US010210549B2

(12) United States Patent
Yi

(10) Patent No.: US 10,210,549 B2
(45) Date of Patent: Feb. 19, 2019

(54) PROMOTION CONTENT DELIVERY WITH MEDIA CONTENT

(71) Applicant: Tencent Technology (Shenzhen) Company Limited, Shenzhen (CN)

(72) Inventor: Qina Yi, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 680 days.

(21) Appl. No.: 14/818,725

(22) Filed: Aug. 5, 2015

(65) Prior Publication Data
US 2015/0339727 A1 Nov. 26, 2015

Related U.S. Application Data

(63) Continuation of application No. PCT/CN2014/083952, filed on Aug. 8, 2014.

(30) Foreign Application Priority Data

Aug. 14, 2013 (CN) .......................... 2013 1 0352794

(51) Int. Cl.
G06Q 30/00 (2012.01)
G06Q 30/02 (2012.01)
(Continued)

(52) U.S. Cl.
CPC ........... *G06Q 30/0269* (2013.01); *G06F 3/02* (2013.01); *G06Q 30/02* (2013.01);
(Continued)

(58) Field of Classification Search
CPC . G06Q 30/0277; G06Q 30/0269; G06Q 30/02
(Continued)

(56) References Cited

U.S. PATENT DOCUMENTS 5,576,844 A * 11/1996 Anderson .............. G09B 5/065
386/264
5,646,997 A * 7/1997 Barton .................. G06T 1/0028
348/E7.056
(Continued)

FOREIGN PATENT DOCUMENTS

CN 101156442 A 4/2008
CN 101262611 A 9/2008
(Continued)

OTHER PUBLICATIONS

Advertsing on Streaming Speach Converted to Text; Yahoo!; Oct. 15, 2010.*
(Continued)

*Primary Examiner* — Luis A Brown
*Assistant Examiner* — Radu Andrei
(74) *Attorney, Agent, or Firm* — Morgan, Lewis & Bockius LLP

(57) ABSTRACT

The present application discloses a method for providing promotion content. A server provides to a client device media content and a sequence of closed caption (CC) messages that are synchronized with the media content. Two consecutive CC messages are separated by a blank duration that is marked by a blank mark and lasts for a predetermined length of time. The client device is configured to detect the blank mark and generate a request for promotion content that includes at least a user identification for identifying a user of the client device. Upon receiving the promotion content request, the server determines user preferences associated with the user identification, and further identifies a promotion content item according to the user preferences. The promotion content item is provided to the client device for concurrent display with the media content during the
(Continued)

blank duration between the corresponding two consecutive CC messages.

20 Claims, 10 Drawing Sheets

(51) Int. Cl.
    *H04N 21/414*     (2011.01)
    *G06F 3/02*     (2006.01)
    *H04L 29/08*     (2006.01)
    *H04W 4/21*     (2018.01)

(52) U.S. Cl.
    CPC ..... *G06Q 30/0246* (2013.01); *G06Q 30/0277* (2013.01); *H04L 67/22* (2013.01); *H04N 21/41415* (2013.01); *H04W 4/21* (2018.02)

(58) Field of Classification Search
    USPC .................................................... 705/14.45
    See application file for complete search history.

(56) References Cited

U.S. PATENT DOCUMENTS

| | | | | |
|---|---|---|---|---|
| 5,751,338 | A * | 5/1998 | Ludwig, Jr. | H04L 12/2859 345/2.2 |
| 6,400,996 | B1 * | 6/2002 | Hoffberg | G05B 19/0426 370/218 |
| 6,463,444 | B1 * | 10/2002 | Jain | G06F 17/30787 |
| 6,567,980 | B1 * | 5/2003 | Jain | G06F 17/30265 707/999.104 |
| 6,850,252 | B1 * | 2/2005 | Hoffberg | G06K 9/00369 348/E7.061 |
| 7,006,881 | B1 * | 2/2006 | Hoffberg | G05B 15/02 700/17 |
| 7,295,752 | B1 * | 11/2007 | Jain | G06F 17/30787 348/E7.073 |
| 8,752,085 | B1 * | 6/2014 | Brueck | H04L 65/601 725/32 |
| 2001/0018693 | A1 * | 8/2001 | Jain | G06F 17/30265 715/201 |
| 2003/0033347 | A1 * | 2/2003 | Bolle | G06F 17/30253 718/107 |
| 2003/0131362 | A1 * | 7/2003 | Jasinschi | G06F 17/30787 725/134 |
| 2003/0169366 | A1 * | 9/2003 | Lenzi | H04N 5/278 348/461 |
| 2004/0109059 | A1 * | 6/2004 | Kawakita | H04N 7/18 348/143 |
| 2006/0074895 | A1 * | 4/2006 | Belknap | G06F 17/3074 |
| 2006/0200259 | A1 * | 9/2006 | Hoffberg | G05B 15/02 700/86 |
| 2006/0287912 | A1 * | 12/2006 | Raghuvamshi | G06Q 30/02 705/14.4 |
| 2007/0027749 | A1 * | 2/2007 | Peiro | G06Q 30/00 705/14.4 |
| 2008/0083157 | A1 | 4/2008 | Chao | |
| 2008/0229205 | A1 | 9/2008 | Lee et al. | |
| 2010/0175084 | A1 * | 7/2010 | Ellis | G06Q 30/00 725/32 |
| 2010/0205049 | A1 * | 8/2010 | Long | G06Q 30/02 705/14.5 |
| 2011/0066504 | A1 * | 3/2011 | Chatow | G06Q 30/02 705/14.65 |
| 2011/0145857 | A1 * | 6/2011 | Agarwal | G06Q 30/02 725/32 |
| 2011/0320197 | A1 * | 12/2011 | Conejero | G06F 17/3002 704/235 |
| 2013/0174191 | A1 * | 7/2013 | Thompson, Jr. | G06Q 30/0207 725/23 |
| 2014/0068662 | A1 * | 3/2014 | Kumar | H04N 21/23424 725/34 |
| 2014/0259180 | A1 * | 9/2014 | Shen | G06F 21/10 726/27 |

FOREIGN PATENT DOCUMENTS

| | | |
|---|---|---|
| CN | 101615387 A | 12/2009 |
| CN | 102136927 A | 7/2011 |
| CN | 102651827 A | 8/2012 |
| CN | 102904918 A | 1/2013 |
| CN | 103164416 A | 6/2013 |
| CN | 103186865 A | 7/2013 |
| TW | 201301832 A | 1/2013 |

OTHER PUBLICATIONS

Cannel Promotion Companion to In-Stem Video Advertisement; Disclosed Anonymous; Jul. 28, 2014.*
Tencent Technology, IPRP, PCT/CN2014/083952, dated Feb. 16, 2016, 5 pgs.
Tencent Technology, ISRWO, PCT/CN2014/083952, dated Nov. 19, 2014, 7 pgs.

* cited by examiner

PROMOTION CONTENT DELIVERY WITH MEDIA CONTENT

RELATED APPLICATIONS

This application is a continuation application of PCT Patent Application No. PCT/CN2014/083952, entitled "PROMOTION CONTENT DELIVERY WITH MEDIA CONTENT" filed on Aug. 8, 2014, which claims priority to Chinese Patent Application No. 201310352794.3, entitled "METHODS AND SYSTEMS FOR BROADCASTING MEDIA CONTENT AND PROCESSING MEDIA RESPONSES," filed on Aug. 14, 2013, both of which are incorporated by reference in their entirety.

TECHNICAL FIELD

The present application relates to the field of data processing, and in particular, to methods, devices and systems for providing promotion content for display with media content and tracking a user's response to the promotion content.

BACKGROUND

Promotion content (e.g., advertisement) is normally delivered with other information content when the other information content is delivered to its target audience over the Internet. The promotion content could be displayed on a user interface according to different formats, e.g., in an embedded video playing window or as a static image banner. The promotion content is normally related to a specific service or product, and associated with a link to a separate webpage that is supported by a service or product provider of the specific service or product. When the target audience clicks on the link, the separate webpage is loaded, and information associated with the specific service or product is displayed to the target audience. In this promotion content delivery scenario, the information associated with the specific service or product would be delivered efficiently and reaches the target audience as intended, only when the promotion content and information of the separate webpage are associated with media content that is properly selected according to the target audience.

The promotion content is normally integrated on a webpage (e.g., Yahoo and Facebook) or a user interface of a software application, and displayed in a variety of formats. For example, a sequence of promotional messages are displayed sequentially on a blogging website (e.g., Sina Weibo) when a user of a client device accesses the blogging website customized for the user. The promotional messages are displayed as blog posts and merge with other posts created by the user of the client device. Then, such a promotional message sequence forms part of an information flow for the user, and could be used to deliver advertisement information to the user or his followers on the blogging website. In another example, some social media websites generate "News Feed" for their users by dynamically collecting information from the Internet. New messages in "News Feed" are chronically arranged, and are another example of the aforementioned promotion content.

A promotion content item is oftentimes delivered between two other media content items that are intended for a user of a client device. However, most media content items and the promotion content items are displayed as static items on the display of the client device. As shown in the above example, in the blogging website, every promotional message is statically displayed between the blog posts created by the user of the client device. Even if the media content items are video clips, the promotion content item (e.g., an advertisement message or clip) is only inserted and displayed between two video clips. In these circumstances, the promotion content item has been determined when the webpage was first loaded, and would not be updated until another webpage refresh request is made by the client device. Although the amount of information contained in the promotion content item is relatively limited, it requires a large real estate on the user interface for displaying the promotion content item, and thereby, compromises a delivery rate of the promotion content item (i.e., the amount of information that is displayed on a user interface and delivered to the target audience within a predetermined time duration).

In the above static promotion content delivery scenario, the delivery rate of the promotion content item would be raised, when a larger physical area on the user interface is used to display the promotion content item. A larger display are of the client device or a scrollable user interface design could have to be applied to obtain a higher delivery rate for the delivery rate of the promotion content item, which inevitably compromises the client device's operational efficiency. It would be beneficial to have a more efficient promotion content presentation mechanism than the current practice.

SUMMARY

The above deficiencies and other problems associated with the conventional approaches of promotion content presentation are reduced or eliminated by the application disclosed below. In some embodiments, the application is implemented in a server system that has one or more processors, memory and one or more modules, programs or sets of instructions stored in the memory for performing multiple functions. Instructions for performing these functions may be included in a computer program product configured for execution by one or more processors.

One aspect of the application is a method that is implemented on a server system for providing promotion content with media content. The method includes providing, to a client device, the media content and a sequence of closed caption (CC) messages that are synchronized with the media content, wherein at least two consecutive CC messages of the CC message sequence are separated by a blank duration, and the blank duration is marked by a blank mark and lasts for a predetermined length of time. The method further includes receiving, from the client device, a request for promotion content. The promotion content request at least includes a user identification in accordance with detecting the blank mark associated with the media content, and the user identification identifies a user of the client device. The method further includes determining a plurality of user preferences associated with the received user identification, and determining one or more promotion content items according to the plurality of user preferences. The method further includes providing the one or more promotion content items to the client device, wherein the one or more promotion content items are configured to be concurrently displayed with the media content during the blank duration between the at least two consecutive CC messages.

Another aspect of the application is a server system that that includes one or more processors and memory having at least one program (including instructions) stored thereon, which when executed by the one or more processors causes the processors to perform operations in the method described above. The at least one program is configured to cause the processors to provide, to a client device, the media content and a sequence of closed caption (CC) messages that are synchronized with the media content, wherein at least two consecutive CC messages of the CC message sequence are separated by a blank duration, and the blank duration is marked by a blank mark and lasts for a predetermined length of time. The at least one program is further configured to cause the processors to receive, from the client device, a request for promotion content. The promotion content request at least includes a user identification in accordance with detecting the blank mark associated with the media content, and the user identification identifies a user of the client device. The at least one program is further configured to cause the processors to determine a plurality of user preferences associated with the received user identification, and determine one or more promotion content items according to the plurality of user preferences. The at least one program is further configured to cause the processors to provide the one or more promotion content items to the client device, wherein the one or more promotion content items are configured to be concurrently displayed with the media content during the blank duration between the at least two consecutive CC messages.

Another aspect of the application is a method that is implemented on a client device for obtaining promotion content with media content. The method includes receiving the media content and a sequence of closed caption (CC) messages that are synchronized with the media content, wherein at least two consecutive CC messages of the CC message sequence are separated by a blank duration, and the blank duration is marked by a blank mark and lasts for a predetermined length of time. The method further includes in accordance with detecting the blank mark, generating a request for promotion content, and the promotion content request at least includes a user identification that identifies a user of the client device and is associated with a plurality of user preferences for promotion content. The method further includes receiving one or more promotion content items that are determined by a server computer according to the user identification, and concurrently displaying the one or more promotion content items with the media content during the blank duration between the at least two consecutive CC messages.

Other embodiments and advantages may be apparent to those skilled in the art in light of the descriptions and drawings in this specification.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

To describe the technical solutions according to the embodiments of the present application or in the prior art more clearly, the accompanying drawings for describing the embodiments or the prior art are introduced briefly in the following. Apparently, the accompanying drawings in the following description are only some embodiments of the present application, and persons of ordinary skill in the art can derive other drawings from the accompanying drawings without creative efforts.

Like reference numerals refer to corresponding parts throughout the several views of the drawings.

DESCRIPTION OF EMBODIMENTS

Figure 1:
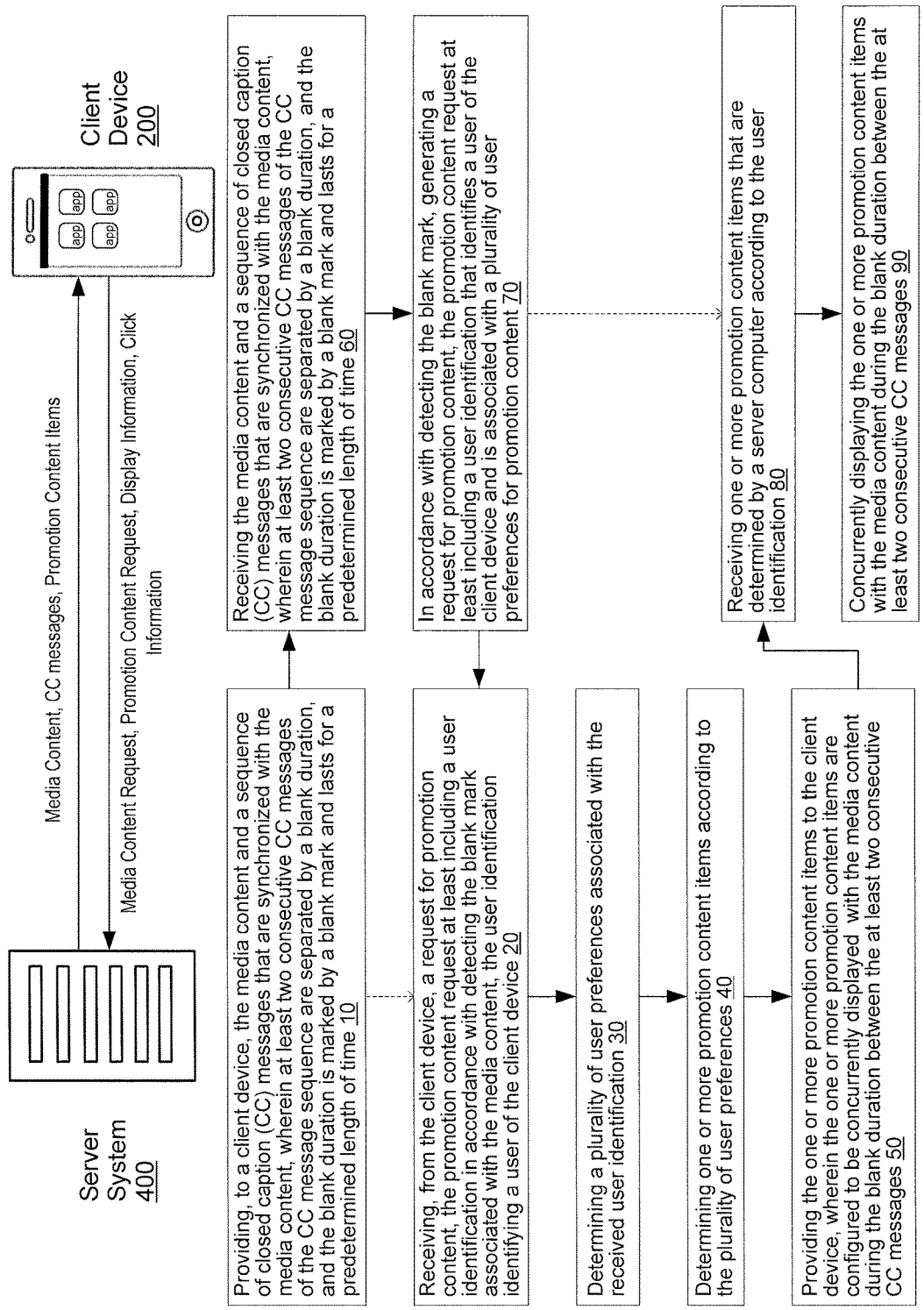
FIG. 1 illustrates an exemplary promotion content management process in which promotion content is provided, displayed and analyzed for a client device in accordance with some embodiments. In this promotion content management process.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

In various embodiments of the present application, promotion content is concurrently displayed with media content that is currently displayed on a display of a client device. Specifically, the promotion content is inserted into a sequence of closed capture (CC) messages that are concurrently displayed with the media content. The CC message sequence includes a respective blank duration between every two consecutive CC messages, and is selectively marked with one or more blank marks within a subset of blank durations. Each blank mark indicates that the corresponding blank duration could accommodate one or more promotion content items. Thus, in accordance with detecting a blank mark, the client device provides its user identification information to a server system, and the server system then identifies user preferences in a user preference database according to the user identification information. Further, the server system determines one or more promotion content items based on the identified user preferences, and sends the one or more promotion content items to the client device. In some implementations, the one or more promotion content items are displayed on the display of the client device during a blank duration between the corresponding two consecutive CC messages; stated another way, the one or more promotion content items become part of the CC message sequence and are concurrently displayed with the media content that is currently displayed on the display of the client device. As such, the one or more promotion content items share the CC messages a display time with that is originally not used, and do not require an additional display area on the display of the client device. Such an arrangement for delivering promotion content effectively increases a delivery rate of the existing display of the client device, while not demanding a larger display area or any additional user actions.

FIG. 1 illustrates an exemplary promotion content management process in which promotion content is provided, displayed and analyzed for a client device 200 in accordance with some embodiments. In this promotion content management process, client device 200 sends media content requests and promotion content requests to request media content and promotion content from a server system 400, respectively. In response to these requests, server system 400 provides media content, caption data (e.g., a sequence of closed caption messages) and promotion content items to client device 200. When a user of client device 200 displays the above information, display information is returned to server system 400 as a feedback concerning the display. Further, when the user of client device 200 responds to the delivered promotion content items by clicking on a corresponding link to one or more of the delivered promotion content items, click information is returned to server system 400 as a feedback concerning whether the user is interested in the delivered promotion content items.

Specifically, on a server side, server system 400 provides (10), to client device 200, the media content and a sequence of closed caption (CC) messages that are synchronized with the media content. At least two consecutive CC messages of the CC message sequence are separated by a blank duration, and the blank duration is marked by a blank mark and lasts for a predetermined length of time. Server system 400 further receives (20), from client device 200, a request for promotion content. The promotion content request at least includes a user identification in accordance with detecting the blank mark associated with the media content, and the user identification identifies a user of client device 200. Server system 400 further determines (30) a plurality of user preferences associated with the received user identification, and identifies (40) one or more promotion content items according to the plurality of user preferences. Server system 400 therefore provides (50) the one or more promotion content items to client device 200, and the one or more promotion content items are configured to be concurrently displayed with the media content during the blank duration between the at least two consecutive CC messages.

On a client side, client device 200 receives (60) the media content and the sequence of closed caption (CC) messages that are synchronized with the media content. At least two consecutive CC messages of the CC message sequence are separated by a blank duration, and the blank duration is marked by a blank mark and lasts for a predetermined length of time. In accordance with detecting the blank mark, client device 200 generates a request for promotion content. The promotion content request at least includes (70) the user identification that identifies a user of client device 200 and is associated with a plurality of user preferences for promotion content. Client device 200 further receives (80) one or more promotion content items that are determined by a server computer according to the user identification. The one or more promotion content items are concurrently displayed (90) with the media content during the blank duration between the at least two consecutive CC messages.

Caption data are communicated together with the media content, and displayed as a sequence of closed caption (CC) messages concurrently with the media content on a display of client device 200. The CC messages provide additional or interpretive information associated with the media content. In some implementations, the CC messages transcribe audio information associated with the media content verbatim or in an edited form. In some implementations, the CC messages include descriptions of non-speech elements, e.g., names of a music episode. In some implementations, the CC message sequence provides a textual alternative language translation of a primary audio language used to present the media content.

In a specific example, the media content is associated with a TV program, a movie, or a stage play, and the CC messages present the corresponding non-visual information (e.g., the conversations in the media content). The CC messages are oftentimes created based on the media content after the media content has been produced. Optionally, the CC messages are represented in a textual or image format.

In some implementations, a CC message has an image format, and is associated with an index file (e.g., a file in a IDX extension) and a data file (e.g., a file in a SUB extension). The index file includes information concerning the CC message, such as the start of the display time with respect to the media content and other display attributes (e.g., fonts, sizes and colors) of the CC message. The data file contains content of the CC message in the image format. In some situations, the data file has a relatively large size depending upon the amount of the content contained in the CC message. In a specific example, the size of the data file is larger than 10 Mbytes, and is compressed to reserve the resources used for storing and transferring the CC message.

In some implementations, a CC message has a textual format, and is associated with a data file that has an extension of ASS, SRT, SMI, SSA or SUB. (Here, a file with the SUB extension could have a distinct data format within the file, when the corresponding CC message has a textual format or an image format.) The CC message that has the textual format results in a substantially small data file that is constructed based on a relatively simple data format. In an exemplary data format, the CC messages' start times and content information are recorded in the data file in an alternating format, and each start time is associated with a respective CC message that follows the start time. Specifically, SRT data files have been widely applied to store the CC messages due to their small size and simple data formats.

In some implementations, the CC messages associated with the media content transcribe the audio information associated with the media content in multiple languages.

When the media content is displayed on the display of client device 200, the user of client device 200 chooses one of the multiple languages for concurrent display with the media content.

Optionally, a CC message sequence is associated and recorded together with the media content when the media content is rendered on a media recording material (such as a tape or a DVD disc). The CC messages are permanently coupled with the media content. Optionally, a CC message sequence is recorded in a separate data file (e.g., SUB, SRT, SSA and ASS files). The CC messages need to be synchronized with the media content when they are displayed together on a display of client device 200. In some implementations of the present application, the CC messages that are displayed with the media content are stored in a data file distinct from a media data file associated with the media content. In this separate data file, each CC message is associated with at least content information of the respective CC message, a start time and an end time with respect to the media content.

In some embodiments, the total length of the one or more promotion content items is shorter than the predetermined length of time of the blank duration, such that the one or more promotion content items are displayed between the at least two consecutive CC messages of the CC message sequence.

In some embodiments, the one or more promotion content items are configured to be displayed at a location (e.g., in proximity to a top or bottom margin) on a display of client device 200 where the CC messages in the CC message sequence are displayed.

In some embodiments, the blank duration is marked with a termination mark prior to a start of a latter message of the at least two consecutive CC messages. Client device 200 is configured to forgo displaying the one or more promotion content items, when it has not received any of the one or more promotion content items from the server system prior to encountering the termination mark during the course of displaying the media content and the CC message sequence. Further, in some embodiments, the blank duration is marked with a termination mark prior to a start of a latter message of the at least two consecutive CC messages, and client device 200 is configured to cease displaying the one or more promotion content items in accordance with encountering the termination mark in the blank duration during the course of displaying the media content and the CC message sequence.

In some embodiments, every two consecutive CC messages of the CC message sequence are separated by a respective blank duration. For every two consecutive CC messages, server system 400 determines whether a length of the respective blank duration between the respective two consecutive CC messages exceeds a predetermined threshold length, and in accordance with a determination that the length of the respective blank duration exceeds the predetermined threshold length, associates the respective blank duration with a corresponding blank mark.

In some embodiments, in accordance with a user click on the one or more promotion content items that are displayed with the media content on a display of client device 200, server system 400 receives from client device 200, and tracks click information associated with the media content and the one or more promotion content items. The click information includes a first identifier that identifies the media content, one or more second identifiers each of which identifies one of the one or more promotion content items, and one or more click numbers each of which indicates how many times the one or more promotion content items has been clicked on. Further, in some embodiments, the click information is analyzed statistically for the purpose of monitoring delivery of promotion content in association with the media content and interest of the user of client device 200 on the one or more promotion content items.

In some embodiments, the user identification is one of: a predefined user identifier, an IP address of client device 200, and user-related cookie information that is recorded by a browser on client device 200. In some embodiments, the one or more promotion content items include one or more textual advertising messages inserted between the at least two consecutive CC messages.

Figure 2A:
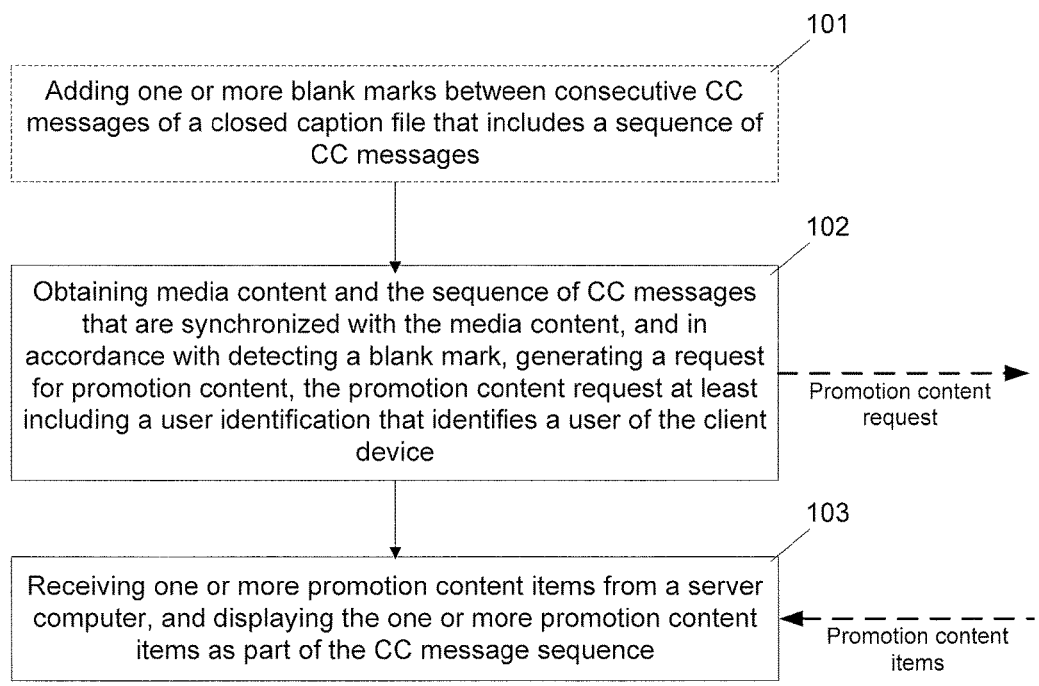
FIG. 2A illustrates a flow chart of a promotion content display method that is implemented on a client device in accordance with some embodiments.

FIG. 2A illustrates a flow chart of an exemplary promotion content display method 100 that is implemented on a client device 200 in accordance with some embodiments. Method 100 is, optionally, governed by instructions that are stored in a non-transitory computer readable storage medium and that are executed by one or more processors of client device 200. Each of the operations shown in FIG. 2A may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 100 may be combined and/or the order of some operations may be changed.

In accordance with promotion content display method 100, client device 200 issues a promotion content request and receives promotion content items returned in response to the promotion content request. At step 101, client device 200 optionally adds one or more blank marks between consecutive CC messages of a closed caption file that includes a sequence of CC messages. In some embodiments, these blank marks are already marked in the closed caption file when client device 200 receives the closed caption file. Thus, step 101 is optionally implemented on client device 200.

In a specific example, a blank mark is represented by "<AD>" in the corresponding closed caption file. Each of the one or more blank marks is placed in a respective blank duration between the respective consecutive CC messages. Once the blank mark is identified, a specific time duration is identified between the blank mark and a start of the latter CC message of the corresponding consecutive CC messages. In some implementations, the total length of one or more promotion content items placed in the corresponding blank duration has to be shorter than the length of the specific time duration; otherwise, the one or more promotion content items have to be truncated to fit into the specific time duration between the blank mark and a start of the following CC message.

In some implementations, a user interface is rendered on client device 200, and allows a user to mark blank marks between consecutive CC messages manually. The closed caption file marked with the blank marks is stored in a closed caption module. Alternatively, in some implementations, in accordance with predetermined blank identification criteria, the closed caption module of client device 200 automatically creates the blank marks in the corresponding closed caption file without user involvement. Specifically, a respective blank duration between every two consecutive CC messages is checked. Upon determining that the length of the respective blank duration exceeds a predetermined threshold length, the closed caption module places a blank mark in the respective blank duration. Likewise, the closed caption file marked with the blank marks is stored in the closed caption module, and a media play of client device 200 retrieves the CC message sequence from the closed caption module for concurrent display with the media content.

At step 102, client device 200 obtains media content and the sequence of CC messages that are synchronized with the media content, and in accordance with detecting a blank mark, generates a request for promotion content. The promotion content request at least includes a user identification that identifies a user of the client device 200.

In some embodiments, the user identification is a predefined user identifier associated with a user account that is held by a user of client device on a social network, an instant messaging application or other internet software applications. Alternatively, in some embodiments, the user identification is one of an IP address of client device 200, and user-related cookie information that is recorded by a browser on client device 200. The user-related cookie information is stored locally on client device 200, when a browser operates an internet software application supported by a remote server (e.g., a promotion content server). In some embodiments, the user-related cookie information is stored in a text file and has a substantially small file size. The text file includes one or more of a user identifier, a password, an access history, and a use time of each use of the corresponding internet software application. When the same internet software application or a distinct internet software application is operated on client device 200, the text file is loaded to provide the user-related cookie information automatically. In some implementations, the user identifier in the user-related cookie information is extracted by client device 200, and sent to server system 400 which uses the user identifier to determine the user preferences and thereby the promotion content items desired by the corresponding user of client device 200.

At step 103, client device 200 receives one or more promotion content items from server computer 400, and displays the one or more promotion content items as part of the CC message sequence.

It should be understood that the particular order in which the operations in FIG. 2A have been described are merely exemplary and are not intended to indicate that the described order is the only order in which the operations could be performed. One of ordinary skill in the art would recognize various ways to cache and distribute specific data as described herein. Additionally, it should be noted that details of other processes described herein with respect to method 100 (e.g., FIG. 2A) are also applicable in an analogous manner to the methods described with respect to FIGS. 1 and 3. For brevity, these details are not repeated here.

Figure 2B:
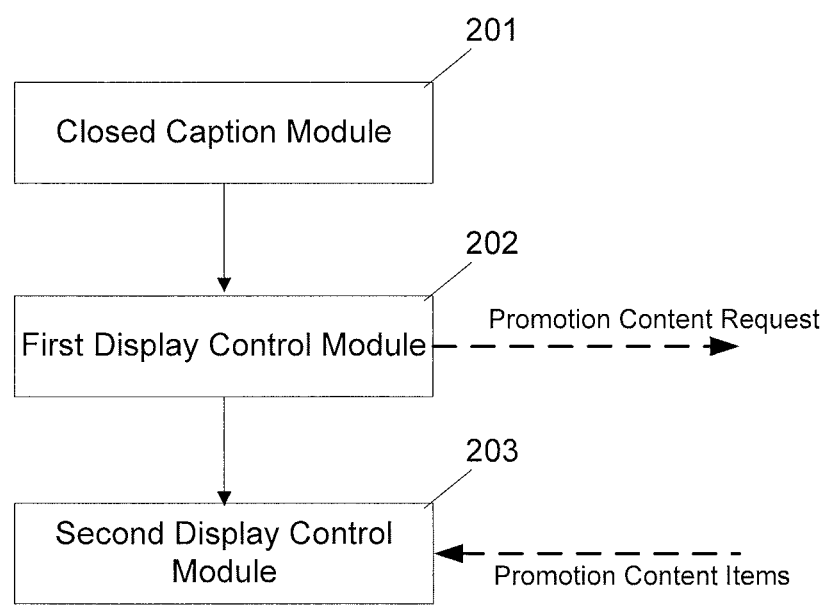
FIG. 2B is a block diagram of an exemplary client device that concurrently displays promotion content with media content on its display in accordance with some embodiments.

FIG. 2B is a block diagram of an exemplary client device 200 that concurrently displays promotion content with media content on its display in accordance with some embodiments. Specifically, in some embodiments, client device 200 shown in FIG. 2B is applied to implement promotion content display method 100. Client device 200 optionally includes a closed caption module 201, a first display control module 202, and a second display control module 203.

Closed caption module 201 is configured to store caption data including a sequence of CC messages. The CC message sequence includes one or more blank marks each marking a blank duration between two consecutive CC messages in the CC message sequence. In some embodiments, a user interface is rendered to allow a user to add blank marks to the CC message sequence manually, and then store the corresponding caption data in closed capture module 201.

First display module 202 is configured to generate a promotion content request in accordance with detecting a blank mark in the updated caption data, when corresponding media content is displayed on the display of client device 200. The promotion content request includes at least a user identification, and is sent to server system 400 to request one or more promotion content items according to the user identification. More details on the user identification are explained above with reference to FIG. 2A.

Second display module 203 is configured to receive from server system 400 the one or more promotion content items determined according to the user identification. The one or more promotion content items are inserted into the corresponding blank duration between the two consecutive CC messages, and concurrently displayed with the corresponding media content. Each of the one or more promotion content items is a text message or an image.

Figure 3:
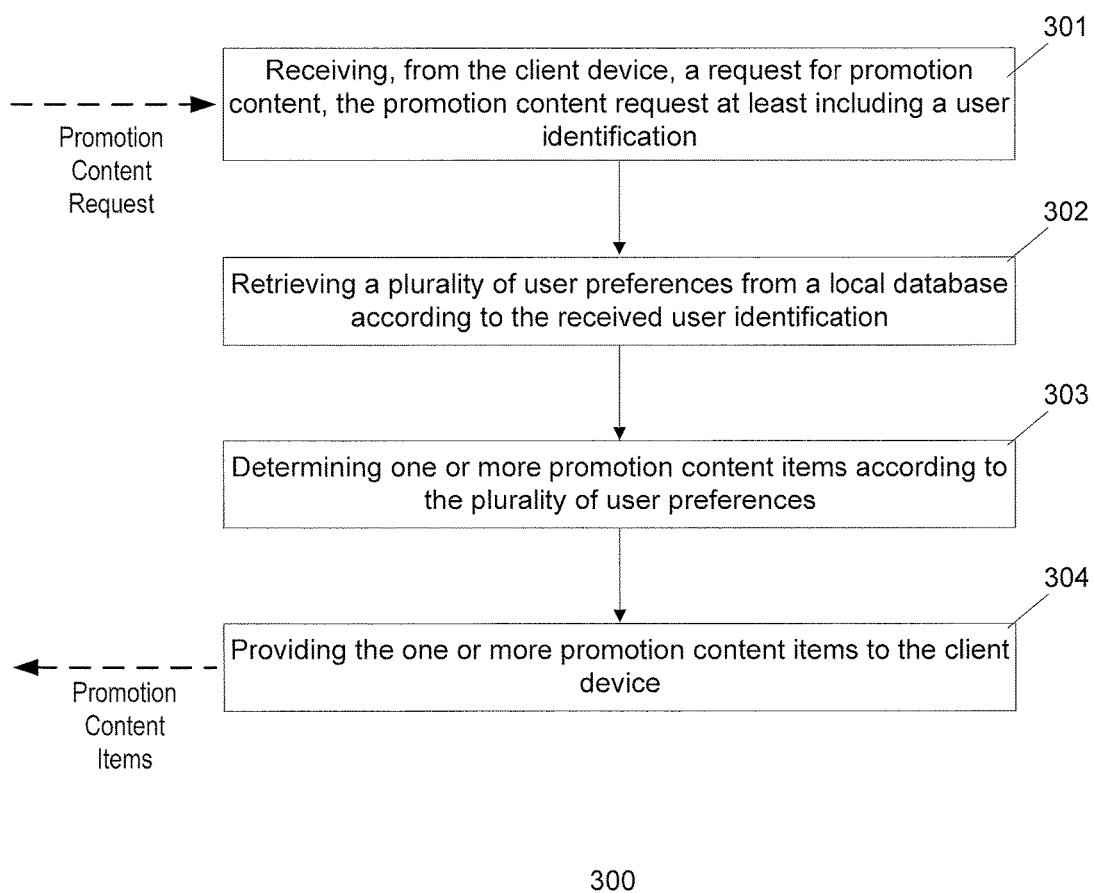
FIG. 3 illustrates a flow chart of a promotion content identification method that is implemented on a server system in accordance with some embodiments.

FIG. 3 illustrates a flow chart of a promotion content identification method 300 that is implemented on a server system (e.g., server system 400) in accordance with some embodiments. Method 300 is, optionally, governed by instructions that are stored in a non-transitory computer readable storage medium and that are executed by one or more processors of a server system. Each of the operations shown in FIG. 3 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 100 may be combined and/or the order of some operations may be changed.

Server system 400 receives (301) from client device 200 a request for promotion content, and the promotion content request at least includes a user identification. In some embodiments, in response to the promotion content request, server system 400 retrieves (302) a plurality of user preferences from a database (e.g., a local database at server system 400 or a remote database at a user preference server) according to the received user identification. Here, the user preferences specify the preferences of promotion content by the corresponding user of client device 200. The user preferences are optionally defined by the user of client device 200, or derived from the user's past activities.

Then, one or more promotion content items are determined (303) according to the plurality of user preferences. In some implementations, such promotion content items are originally stored in a promotion content database in which each promotion item is associated with one or more of a promotion content identifier, a text message including the corresponding promotion content, one or more content subjects, a link, information concerning a promotion content provider, and the like. When the determined user preferences associated with the user of client device 200 match the one or more content subjects of the promotion content items in the promotion content database, the corresponding promotion content items are identified for display on the display of client device 200. In some implementations, each promotion content item is further associated with a priority level, and a subset (not all) of the identified promotion items that have preferred priority levels are selected for display on the display of client device 200.

Server system 400 provides (304) the determined one or more promotion content items to client device 200.

In some embodiments, the user's characteristics are involved in determining the user preferences and the one or more promotion content items for the specific user. The user's characteristics are optionally summarized based on the user's previous activities (e.g., websites previously visited by the user, media content previously reviewed by the user, and promotion content items that have been clicked by the user). Specifically, in some implementations, the user's characteristics are statically analyzed from the user's past activities within a predetermined period of time. Further, in some other embodiments, characteristics obtained from a group of users are used to determine the one or more promotion content items provided to the specific user of client device 200. Therefore, in response to the promotion content request, server system 400 optionally obtains (302) a plurality of user characteristics from a database (e.g., a local database at server system 400 or a remote database at a user characteristic server) according to the received user identification. Optionally, server system 400 determines the user characteristics by analyzing the user's history of activities stored in a database according to the user identification. In accordance with the user's characteristics, server system 400 identifies the one or more promotion content items for the user of client device 200. Likewise, all or a subset of the one or more promotion content items are selected for display on client device 200.

It should be understood that the particular order in which the operations in FIG. 2 have been described are merely exemplary and are not intended to indicate that the described order is the only order in which the operations could be performed. One of ordinary skill in the art would recognize various ways to cache and distribute specific data as described herein. Additionally, it should be noted that details of other processes described herein with respect to method 300 (e.g., FIG. 3) are also applicable in an analogous manner to the other methods described above with respect to FIGS. 1 and 2A. For brevity, these details are not repeated here.

Figure 4:
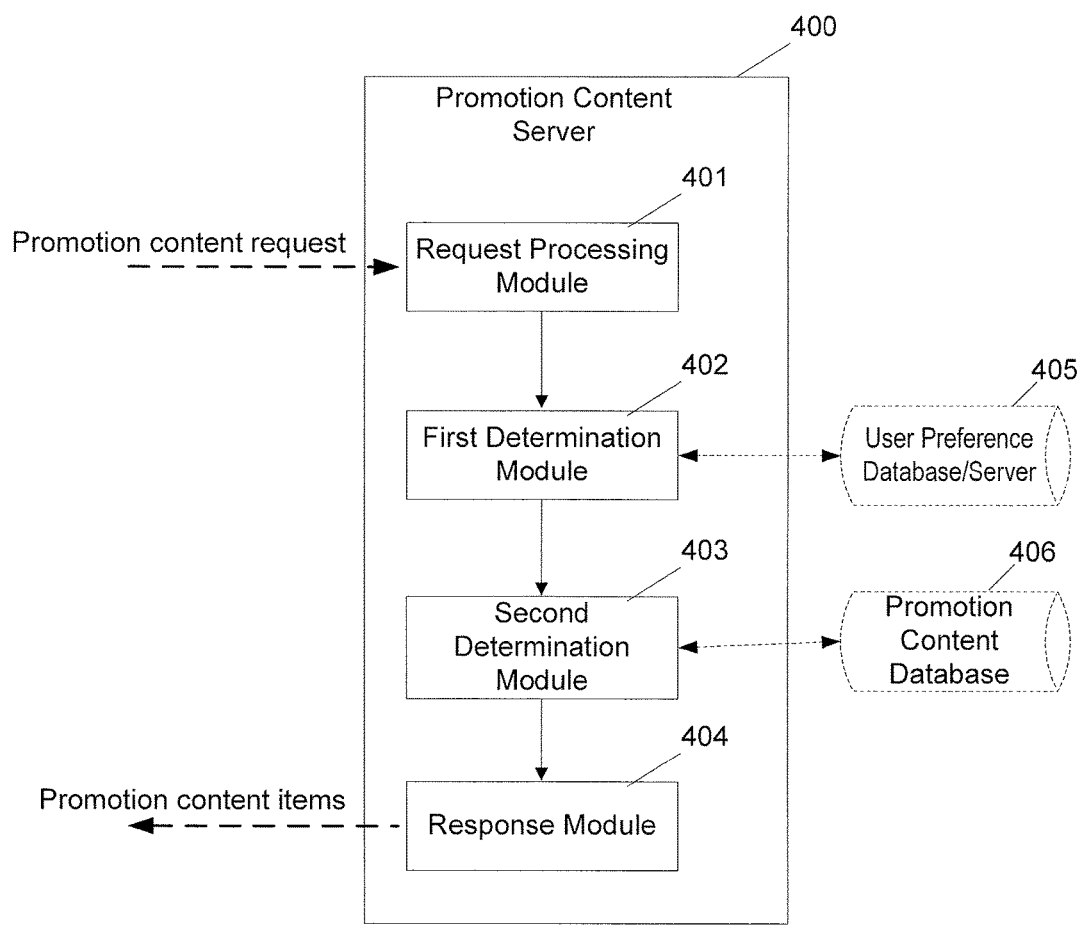
FIG. 4 is a block diagram of an exemplary server system that provides promotion content to a client device in accordance with some embodiments.

FIG. 4 is a block diagram of an exemplary server system 400 that provides promotion content to a client device in accordance with some embodiments. Specifically, in some embodiments, server system 400 shown in FIG. 4 is applied to implement promotion content identification method 300. Server system 400 optionally includes a request processing module 401, a first determination module 402, a second determination module 403, and a response module 403. Server system 400 optionally includes a user preference database 405, a promotion content database 406, or both. Optionally, server system 400 does not include database 405 or 406, but is coupled to an external user preference server 405, an external promotion content database 406 or both.

Request processing module 401 is configured to receive, from client device 200, a promotion content request that at least includes a user identification. First determination module 402 is configured to send a query to a user preference database or server 405, and retrieve a plurality of user preferences from the user preference database or server 405 according to the received user identification. The query to the user preference database or server 405 includes the user identification. In some embodiments, for each user associated with the respective user identification in database 405, the corresponding user preferences are predefined by the respective user on a user interface of a client device (e.g., device 200). In some embodiments, for each user associated with the respective user identification in database 405, the user preferences are statistically determined based on the respective user's own or some other users' history of activities. More details on the user preferences are explained above with reference to FIG. 3.

Second determination module 403 is configured to determine one or more promotion content items according to the plurality of user preferences. In some embodiments, second determination module 403 is configured to send a query to promotion content database 406, and the query includes first identifiers associated with the determined user preferences. As explained above, each promotion content item stored in promotion content database 406 is associated with second identifiers for one or more content subjects of the respective promotion content item. In some situations, a first identifier associated with the determined user preferences matches a second identifier for the subjects corresponding to one or more specific promotion content items in promotion content database 406. Then, all or a subset of the one or more specific promotion content items are identified for display on client device 200. In some implementations, the subset of the specific promotion content items is selected according to their corresponding priority levels.

In a specific example, the user preferences associated with the user identification include "sport car." Then, second determination module 403 identifies in promotion content database 406 one or more advertisement messages having a content subject of "sport car." When the number of messages exceeds a preferred number (e.g., 5), second determination module 403 selects the preferred number of messages from the identified advertisement messages based on a priority level, and such a priority level is optionally determined based on other information concerning an advertisement message (e.g., a message length and a secondary content subject).

Further, response module 404 is configured to provide the one or more promotion content items to client device 200. In some implementations, client device 200 displays the one or more promotion content items as part of the CC message sequence that is concurrently displayed with the media content. Specifically, if the one or more promotion content items include more than one promotion content item, the promotion content items are consecutively displayed within the blank duration between two consecutive CC messages. Optionally, the total length of the one or more promotion content items is shorter than a predetermined length of time of the corresponding blank duration. Otherwise, if the total length of the promotion content items is longer than the length of time of the blank duration, client device 200 forgoes displaying the unfinished part of the one or more promotion content items upon encountering a start of the following message.

In some embodiments, the blank duration is marked with a termination mark prior to the start of the following message, and client device 200 is configured to cease displaying the one or more promotion content items in accordance with encountering the termination mark in the blank duration during the course of displaying the media content and the CC message sequence. Further, in some embodiments, when client device 200 encounters the termination mark in the blank duration, it has not received any of the one or more promotion content items from server system 400. Then, client device 200 forgoes displaying the one or more promotion content items.

In some implementations, both the CC messages and the one or more promotion content items are concurrently displayed with the media content as text messages. These text messages form a text message flow entering and exiting on two opposite sides of the display of client device 200, and thereby, are consecutively displayed on the bottom, the top, the left or the right of the display. Optionally, the CC messages and the one or more promotion content items are displayed in distinct font styles, colors and/or sizes, such that the user of client device 200 could easily tell whether currently displayed content is a CC message or a promotion content item. In some implementations, settings of the one or more promotion content items are not stored in client device 200, but received together with the one or more promotion content items from server system 400.

In some implementations, settings of the one or more promotion content items are stored with information of the blank mark in closed caption module 201. In accordance with detecting the blank mark, client device 200 generates the promotion content request and obtains the promotion content settings. After client device 200 receives the returned one or more promotion content items from server system 400, it applies the obtained promotion content settings to display the one or more promotion content items. In some embodiments, the CC message sequence includes more than one blank duration and corresponding blank marks. Optionally, two of the blank marks are associated with distinct promotion content settings, and thereby, the promotion content items displayed during the corresponding two blank durations are displayed differently, i.e., having distinct font styles, colors and/or sizes.

Alternatively, in some implementations, settings of the one or more promotion content items are stored in a designated promotion setting area in a memory of client device 200. In accordance with receiving the one or more promotion content items from server system 400, client device 200 displays the promotion content items according to the promotion content settings stored in the designated promotion setting area. Preferably, the designated promotion setting area merely stores a limited number (e.g., 1 or 2) of promotion content settings. In accordance with the limited number of promotion content settings, the promotion content items that are displayed in different blank durations could have substantially uniform display styles.

The media content and the promotion content items are associated with a first identifier and one or more second identifiers, respectively. In some embodiments, an analysis server in server system 400 analyzes the frequency of displaying the corresponding media content and promotion content on client device 200 and other client devices. Specifically, the analysis server generates a display analysis request for information concerning the media content and the promotion content items, and client device 200 provides the first and second identifiers in response to the display analysis request. Therefore, an administrator counts the display frequencies and correlations for various media content items and promotion content items, which would be used as a feedback to adjust the strategies of pushing promotion content in the future.

Under these circumstances, promotion content identification method 300 further includes, in accordance with displaying the one or more promotion content items with the media content, tracking display information associated with the media content and the one or more promotion content items. The display information includes a first identifier that identifies the media content, and one or more second identifiers each of which identifies one of the one or more promotion content items.

In some embodiments, the promotion content items displayed with the media content provide one or more links to an external information source concerning the promotion content items. For example, a promotion content item includes a promotion message for Nike shoes. The promotion message is further configured to include a link to Nike.com, such that the user of client device 200 could click on the link to Nike.com and obtain more information concerning Nike shoes. In some embodiments, an analysis server in server system 400 collects and analyzes a number of clicks on each promotion content item displayed on client device 200 or other client devices. Specifically, the analysis server generates a click analysis request for information concerning clicks on the promotion content items, and client device 200 provides the first and second identifiers in response to the click analysis requests. Therefore, an administrator counts the respective click numbers for various promotion content items, which would also be used as a feedback to improve the strategies of pushing promotion content in the future.

Under these circumstances, promotion content identification method 300 further includes, in accordance with a user click on the one or more promotion content items that are displayed with the media content on a display of the client device, tracking click information associated with the media content and the one or more promotion content items. The click information includes the first identifier that identifies the media content, one or more second identifiers each of which identifies one of the one or more promotion content items, and one or more click numbers each of which indicates how many times the one or more promotion content items has been clicked on.

Figure 5:
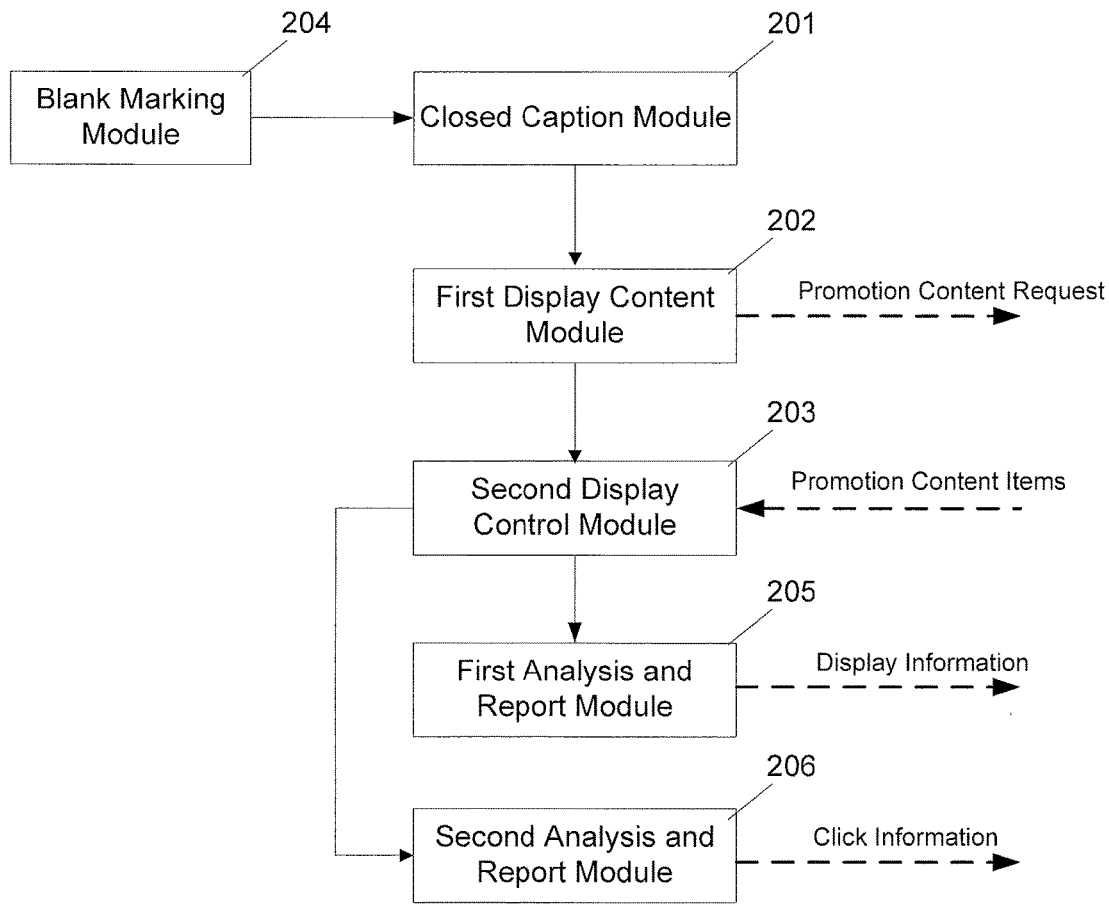
FIG. 5 is a block diagram of another exemplary client device that concurrently displays promotion content with media content on its display in accordance with some embodiments.

FIG. 5 is a block diagram of another exemplary client device 200 that concurrently displays promotion content with media content on its display in accordance with some embodiments. In addition to modules 201-203, client device 200 further includes one or more of a blank marking module 204, a first analysis and report module 205, a second analysis and report module 206. Every two consecutive CC messages of the CC message sequence are separated by a respective blank duration. For every two consecutive CC messages, blank marking module 204 determines whether a length of the respective blank duration between the respective two consecutive CC messages exceeds a predetermined threshold length. In accordance with a determination that the length of the respective blank duration exceeds the predetermined threshold length, blank marking module 204 associates the respective blank duration with a blank mark.

First analysis and report module 205 obtains display information (i.e., information concerning the media content and the one or more promotion content items), and reports such information to a display analysis server of server system 400. Second analysis and report module 206 obtains click information (i.e., information concerning the media content and the one or more promotion content items, including but not limited to, whether a specific promotion content item is clicked on and how many times each promotion content item is clicked on by the user of client device 200 or other client device users.) Second analysis and report module 206 further reports such information to a click analysis server of server system 400. The display or click analysis server further analyzes the received information to determine whether the promotion content has been efficiently delivered to the user, and whether the corresponding promotion strategy need to be adjusted to improve effectiveness of the promotion content delivery process. More details on the display and click analysis processes are discussed above with reference to FIG. 4.

Figure 6:
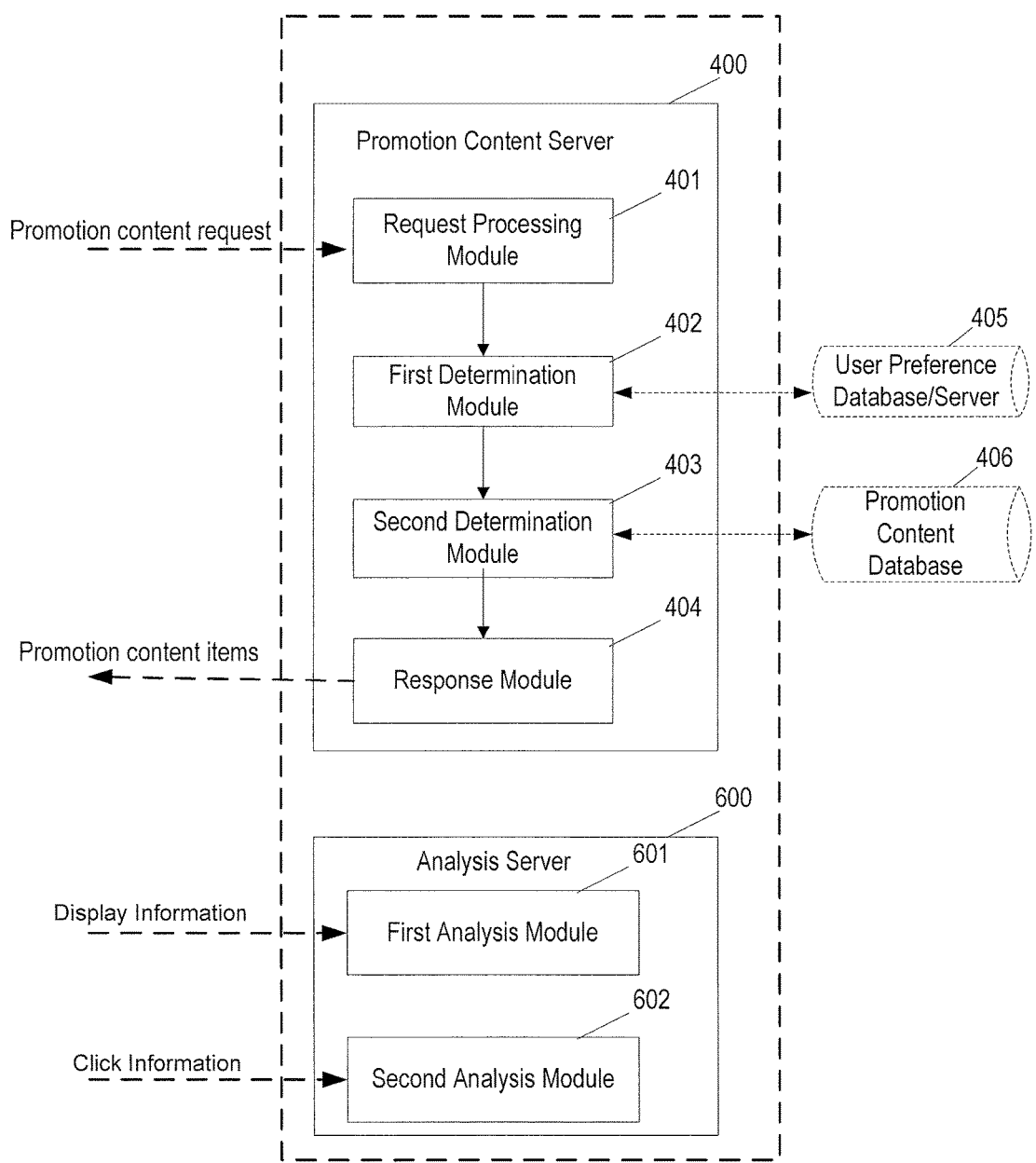
FIG. 6 is a block diagram of an exemplary server system that provides promotion content to a client device and analyzes operations on the provided promotion content on the client device in accordance with some embodiments.

FIG. 6 is a block diagram of an exemplary server system 400 that provides promotion content to a client device 200 and analyzes operations on the provided promotion content on client device 200 in accordance with some embodiments. Server system 400 further includes an analysis server 600 that further includes a first analysis module 601 (e.g., a display analysis module) and a second analysis module 602 ((e.g., a click analysis module). The first and second analysis modules receive display information and click information, respectively. First analysis module 601 counts the display times and frequencies for various media content and promotion content items based on the display information received from the user of client device 200 and/or users of other client devices. The display times and frequencies are further analyzed by first analysis module 601. Likewise, second analysis module 601 counts the numbers of clicks for which various media content and promotion content items are clicked on based on the click information received from the user of client device 200 and/or users of other client devices. The numbers of clicks are further analyzed by second analysis module 602.

Figure 7A:
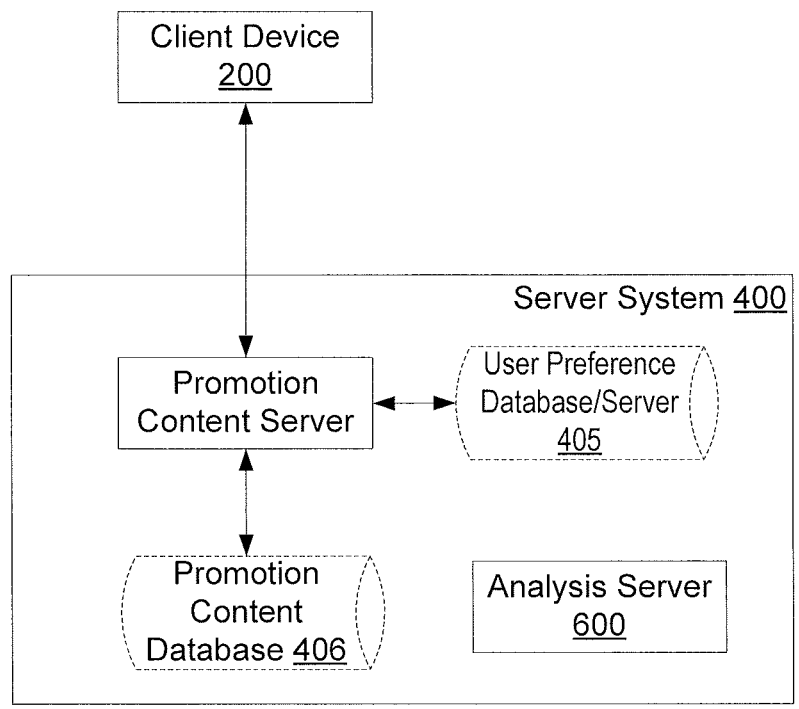
FIG. 7A is a block diagram of a promotion content delivery system in which a promotion content server provides promotion content to a client device in accordance with some embodiments.

FIG. 7A is a block diagram of a promotion content delivery system 700 in which a server system 400 provides promotion content to a client device 200 in accordance with some embodiments. Client device 200 and server system 400 are arranged to implement the content delivery and analysis functions on the foreground and the background, respectively. Server system 400 includes a promotion content server, and optionally includes a user preference database/server 405, a promotion content database 406, and an analysis server 600. In various embodiments of the present application, server system 400 optionally includes a single server machine that provides media content and promotion content, and optionally analyzes the user's operations on the media and promotion content. Stated another way, the promotion content server could include user preference database/server 405, promotion content database 406, and analysis server 600. Optionally, server system 400 includes two or more separate servers (e.g., a promotion content server and an analysis server 600) each of which is configured to implement part of the aforementioned content delivery and analysis functions. More details on the server system's and client device's content delivery and analysis functions are explained above with reference to FIGS. 1-6.

In some embodiments of the present application, the content delivery and analysis functions are implemented to deliver online advertisements to internet users, and specifically, the promotion content items include online advertisement clips. Further, in either client device 200 or sever system 400, their respective functional modules are optionally integrated in one central processing unit (CPU), or distributed on different processing units. Optionally, these functional modules are implemented in hardware devices, or in software programs. Optionally, these functional modules are located at one network terminal or node, or distributed among multiple network terminals or nodes.

Figure 7B:
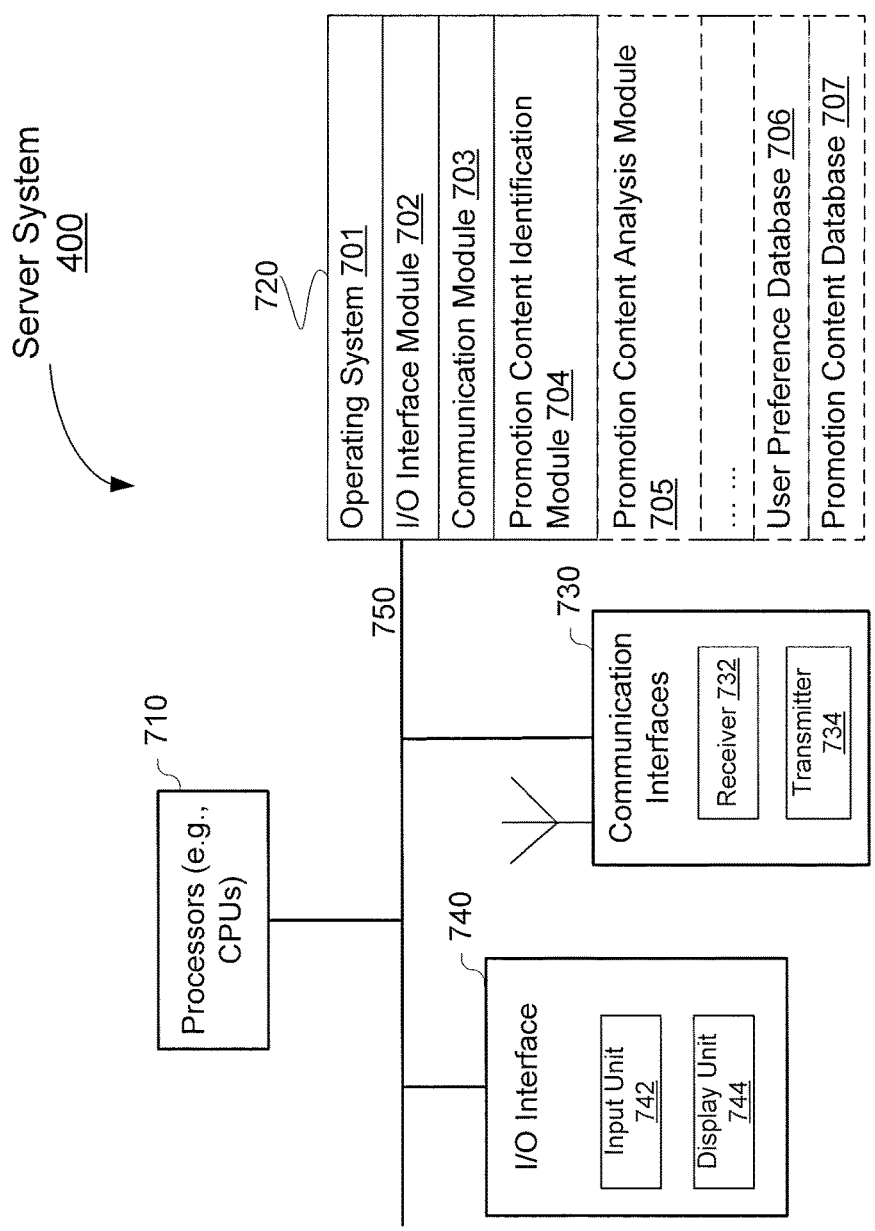
FIG. 7B is a block diagram of an exemplary server system that provides promotion content to a client device in accordance with some embodiments.

FIG. 7B is a block diagram of an exemplary server system 400 that provides promotion content to a client device 200 in accordance with some embodiments. In some implementations, server system 400 at least includes one or more processors 710 (e.g., central processing units) and a memory 720 for storing data, programs and instructions for execution by one or more processors 710. In some implementations, server system 400 further includes one or more communication interfaces 730, an input/output (I/O) interface 740, and one or more communication buses 750 that interconnect these components.

In some embodiments, I/O interface 740 includes an input unit 742 and a display unit 744. Examples of input unit 742 include a keyboard, a mouse, a touch pad, a game controller, a function key, a trackball, a joystick, a microphone, a camera and the like. Additionally, display unit 744 displays information that is inputted by the user or provided to the user for review. Examples of display unit 744 include, but are not limited to, a liquid crystal display (LCD) and an organic light-emitting diode (OLED) display. In some implementations, input unit 742 and display unit 744 are integrated on a touch-sensitive display that displays a graphical user interface (GUI).

In some embodiments, communication buses 530 include circuitry (sometimes called a chipset) that interconnects and controls communications between system components. In some embodiments, communication interfaces 730 further include a receiver 732 and a transmitter 734.

In some embodiments, memory 720 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 720 includes one or more storage devices remotely located from the one or more processors 710. In some embodiments, memory 720, or alternatively the non-volatile memory device(s) within memory 720, includes a non-transitory computer readable storage medium.

In some embodiments, memory 720 or alternatively the non-transitory computer readable storage medium of memory 720 stores the following programs, modules and data structures, instructions, or a subset thereof:
Operating System 701 that includes procedures for handling various basic system services and for performing hardware dependent tasks;
I/O interface module 702 that includes procedures for handling various basic input and output functions through one or more input and output devices, wherein I/O interface module 702 further includes an interface display module that controls displaying of a graphical user interface;
Communication module 703 that is used for connecting server system 400 to other computational devices (e.g., servers and client devices), via one or more network communication interfaces 750 (wired or wireless) and one or more communication networks, such as the Internet, other wide area networks, local area networks, metropolitan area networks, and so on;
Promotion content identification module 704 that receives from client device 200 a request for promotion content, and determines one or more promotion content items according to user preferences associated with a user identification in the promotion content request; and
Promotion content analysis module 705 that analyzes display information and/or click information provided by client device 200.

In some embodiments, memory 720 or alternatively the non-transitory computer readable storage medium of memory 720 further stores:
User preference database 706 that includes user identifications and corresponding user preferences or characteristics; and Promotion content database 707 that includes promotion content items associated with different subjects.

More details on promotion content identification module 704, analysis module 705, user preference database 706 and promotion content database 707 are explained above with reference to FIGS. 1-6.

Figure 7C:
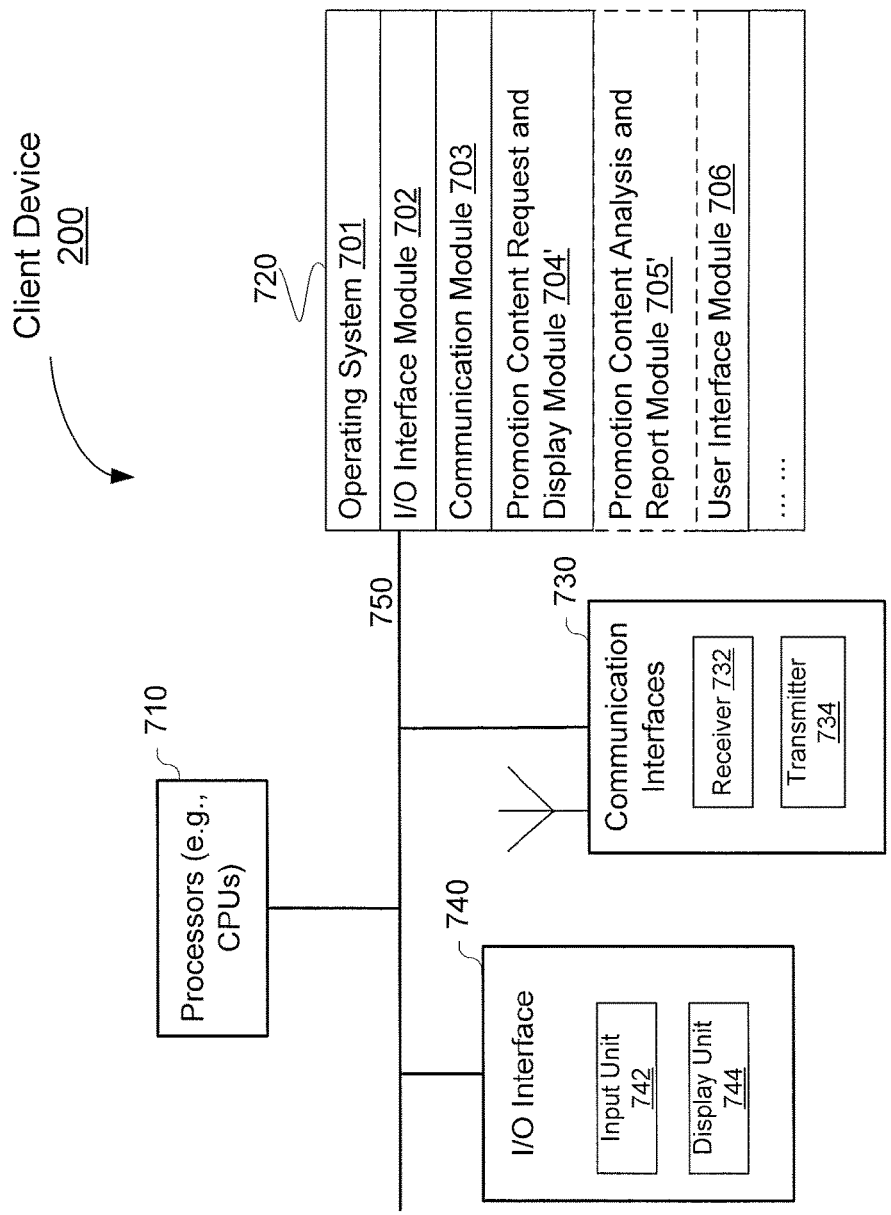
FIG. 7C is a block diagram of an exemplary client device that concurrently displays promotion content with media content on its display in accordance with some embodiments.

FIG. 7C is a block diagram of an exemplary client device 200 that concurrently displays promotion content with media content on its display in accordance with some embodiments. In some implementations, client device 200 at least includes one or more processors 710 (e.g., central processing units) and a memory 720 for storing data, programs and instructions for execution by one or more processors 710. In some implementations, client device 200 further includes one or more communication interfaces 730, an input/output (I/O) interface 740, and one or more communication buses 750 that interconnect these components.

In some embodiments, I/O interface 740 includes an input unit 742 and a display unit 744. Examples of input unit 742 include a keyboard, a mouse, a touch pad, a game controller, a function key, a trackball, a joystick, a microphone, a camera and the like. Additionally, display unit 744 displays information that is inputted by the user or provided to the user for review. Examples of display unit 744 include, but are not limited to, a liquid crystal display (LCD) and an organic light-emitting diode (OLED) display. In some implementations, input unit 742 and display unit 744 are integrated on a touch-sensitive display that displays a graphical user interface (GUI).

In some embodiments, communication buses 530 include circuitry (sometimes called a chipset) that interconnects and controls communications between system components. In some embodiments, communication interfaces 730 further include a receiver 732 and a transmitter 734.

In some embodiments, memory 720 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 720 includes one or more storage devices remotely located from the one or more processors 710. In some embodiments, memory 720, or alternatively the non-volatile memory device(s) within memory 720, includes a non-transitory computer readable storage medium.

In some embodiments, memory 720 or alternatively the non-transitory computer readable storage medium of memory 720 stores the following programs, modules and data structures, instructions, or a subset thereof:

Operating System 701 that includes procedures for handling various basic system services and for performing hardware dependent tasks;

I/O interface module 702 that includes procedures for handling various basic input and output functions through one or more input and output devices, wherein I/O interface module 702 further includes an interface display module that controls displaying of a graphical user interface;

Communication module 703 that is used for connecting client device 200 to other computational devices (e.g., servers and client devices), via one or more network communication interfaces 750 (wired or wireless) and one or more communication networks, such as the Internet, other wide area networks, local area networks, metropolitan area networks, and so on;

Promotion content request and display module 704' that generates a request for promotion request and displays promotion content items that are received from server computer 200;

Promotion content analysis and report module 705' that analyzes display information and click information concerning media content and promotion content items, and reports such information to server system 400; and User interface module 706 that is enabled on a display of client device 200 to display media content, CC messages and promotion content, and/or receive user actions for defining promotion content settings, click information and other settings.

More details on promotion content request and display module 704', and analysis and report module 705' are explained above with reference to FIGS. 1-6.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method of providing promotion content with media content, comprising:
    at a server system having one or more processors and memory storing program modules to be executed by the one or more processors:
        providing, to a client device, the media content and a sequence of closed caption (CC) messages that are synchronized with the media content, wherein at least two consecutive CC messages of the CC message sequence are separated by a blank duration, and the blank duration is marked by a blank mark and lasts for a predetermined length of time;
        receiving, from the client device, a request for promotion content after the client device detects the blank mark associated with the media content, the promotion content request at least including a user identification, the user identification identifying a user of the client device;
        in response to the request for promotion content:
            determining a plurality of user preferences associated with the received user identification;
            determining one or more promotion content items targeting at the user of the client device according to the plurality of user preferences, wherein a total length of the one or more user-targeted promotion content items is shorter than the predetermined length of time of the blank duration separating the at least two consecutive CC messages, such that the one or more user-targeted promotion content items fit in the blank duration between the at least two consecutive CC messages of the CC message sequence without overlapping with the at least two consecutive CC messages; and
            in accordance with the detection of the blank mark marking the blank duration that separates the at least two consecutive CC messages, providing the one or more user-targeted promotion content items to the client device, and enabling display of the one or more user-targeted promotion content items concurrently with the media content during the blank duration separating the at least two consecutive CC messages.

2. The method of claim 1, wherein each CC message of the sequence of CC messages has a textual format, and a data file corresponding to the sequence of CC messages stores at least a start time and content information of each CC message.

3. The method of claim 1, wherein the one or more user-targeted promotion content items are configured to be displayed at a location on a display of the client device where the CC messages in the CC message sequence are displayed.

4. The method of claim 1, wherein the blank duration is marked with a termination mark prior to a start of a latter message of the at least two consecutive CC messages, and the client device is configured to cease displaying the one or more user-targeted promotion content items in accordance with encountering the termination mark in the blank duration during the course of displaying the media content and the CC message sequence.

5. The method of claim 1, wherein the blank duration is marked with a termination mark prior to a start of a latter message of the at least two consecutive CC messages, and the client device is configured to forgo displaying the one or more user-targeted promotion content items, when it has not received any of the one or more user-targeted promotion content items from the server system prior to encountering the termination mark during the course of displaying the media content and the CC message sequence.

6. The method of claim 1, wherein every two consecutive CC messages of the CC message sequence are separated by a respective blank duration, the method further comprising:
    for every two consecutive CC messages:
        determining whether a length of the respective blank duration between the respective two consecutive CC messages exceeds a predetermined threshold length;
        in accordance with a determination that the length of the respective blank duration exceeds the predetermined threshold length, associating the respective blank duration with a corresponding blank mark.

7. The method of claim 1, further comprising:
    in accordance with concurrently displaying the one or more user-targeted promotion content items and the media content on a display of the client device, tracking display information including a first identifier that identifies the media content, and one or more second identifiers each of which identifies one of the one or more user-targeted promotion content items.

8. The method of claim 1, further comprising:
    in accordance with a user click on the one or more user-targeted promotion content items that are displayed with the media content on a display of the client device, tracking click information associated with the media content and the one or more user-targeted promotion content items, wherein the click information comprises a first identifier that identifies the media content, one or more second identifiers each of which identifies one of the one or more user-targeted promotion content items, and one or more click numbers each of which indicates how many times the one or more user-targeted promotion content items has been clicked on.

9. The method of claim 8, wherein the click information is analyzed statistically for the purpose of monitoring delivery of user-targeted promotion content in association with the media content and interest of the user of the client device on the one or more user-targeted promotion content items.

10. The method of claim 1, wherein the user identification is one of: a predefined user identifier, an IP address of the client device, and user-related cookie information that is recorded by a browser on the client device.

11. The method of claim 1, wherein the one or more user-targeted promotion content items comprise one or more textual advertising messages inserted between the at least two consecutive CC messages.

12. A server system, comprising:
    one or more processors; and
    memory having instructions stored thereon, which when executed by the one or more processors cause the processors to perform operations for:

providing, to a client device, the media content and a sequence of closed caption (CC) messages that are synchronized with the media content, wherein at least two consecutive CC messages of the CC message sequence are separated by a blank duration, and the blank duration is marked by a blank mark and lasts for a predetermined length of time;

receiving, from the client device, a request for promotion content after the client device detects the blank mark associated with the media content, the promotion content request at least including a user identification, the user identification identifying a user of the client device;

in response to the request for promotion content:
determining a plurality of user preferences associated with the received user identification;
determining one or more promotion content items targeting at the user of the client device according to the plurality of user preferences, wherein a total length of the one or more user-targeted promotion content items is shorter than the predetermined length of time of the blank duration separating the at least two consecutive CC messages, such that the one or more user-targeted promotion content items fit in the blank duration between the at least two consecutive CC messages of the CC message sequence without overlapping with the at least two consecutive CC messages; and in accordance with the detection of the blank mark marking the blank duration that separates the at least two consecutive CC messages, providing the one or more user-targeted promotion content items to the client device, and enabling display of the one or more user-targeted promotion content items concurrently with the media content during the blank duration separating the at least two consecutive CC messages.

13. The server system of claim 12, wherein each of the user-targeted promotion content items is retrieved from a promotion content database, and associated with one or more of an identifier, a text message including corresponding promotion content, one or more content subject, a link, and information concerning a promotion content provider.

14. The server system of claim 12, wherein the instructions stored on the memory, when executed by the one or more processors, further cause the processors to perform operations for:
in accordance with a user click on the one or more user-targeted promotion content items that are displayed with the media content on a display of the client device, tracking click information associated with the media content and the one or more user-targeted promotion content items, wherein the click information comprises a first identifier that identifies the media content, one or more second identifiers each of which identifies one of the one or more user-targeted promotion content items, and one or more click numbers each of which indicates how many times the one or more user-targeted promotion content items has been clicked on.

15. The server system of claim 14, wherein the click information is analyzed statistically for the purpose of monitoring delivery of user-targeted promotion content in association with the media content and interest of the user of the client device on the one or more user-targeted promotion content items.

16. A method of obtaining promotion content with media content, comprising:
at a client device having one or more processors and memory storing program modules to be executed by the one or more processors:
receiving the media content and a sequence of closed caption (CC) messages that are synchronized with the media content, wherein at least two consecutive CC messages of the CC message sequence are separated by a blank duration, and the blank duration is marked by a blank mark and lasts for a predetermined length of time;

in accordance with detecting the blank mark, generating a request for promotion content, the promotion content request at least including a user identification that identifies a user of the client device and is associated with a plurality of user preferences for promotion content;

in response to the request for promotion content:
receiving one or more user-targeted promotion content items that are determined by a server computer according to the user identification to target at the user of the client device, wherein a total length of the one or more user-targeted promotion content items is shorter than the predetermined length of time of the blank duration separating the at least two consecutive CC messages, such that the one or more user-targeted promotion content items fit in the blank duration between the at least two consecutive CC messages of the CC message sequence without overlapping with the at least two consecutive CC messages; and in accordance with the detection of the blank mark marking the blank duration that separates the at least two consecutive CC messages, obtaining the one or more user-targeted promotion content items and concurrently displaying the one or more user-targeted promotion content items with the media content during the blank duration separating the at least two consecutive CC messages.

17. The method of claim 16, wherein the sequence of CC messages are represented in an image format.

18. The method of claim 16, wherein the blank duration is marked with a termination mark prior to a start of a latter message of the at least two consecutive CC messages, and the client device is configured to cease displaying the one or more user-targeted promotion content items in accordance with encountering the termination mark in the blank duration during the course of displaying the media content and the CC message sequence.

19. The method of claim 16, wherein the user identification is one of: a predefined user identifier, an IP address of the client device, and user-related cookie information that is recorded by a browser on the client device.

20. The method of claim 16, wherein the one or more user-targeted promotion content items comprise one or more textual advertising messages inserted between the at least two consecutive CC messages.

* * * * *